(12) United States Patent
Arellano et al.

(10) Patent No.: US 7,441,038 B2
(45) Date of Patent: Oct. 21, 2008

(54) COORDINATION PLATFORM AND METHOD FOR DYNAMIC AGGREGATION OF WEB SERVICES

(75) Inventors: Javier B. Arellano, Austin, TX (US); Sreenivasa R. Gorti, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 816 days.

(21) Appl. No.: 10/352,219

(22) Filed: Jan. 28, 2003

(65) Prior Publication Data
US 2004/0148334 A1 Jul. 29, 2004

(51) Int. Cl.
G06F 15/173 (2006.01)
(52) U.S. Cl. ..................................................... 709/230
(58) Field of Classification Search ................ 709/230, 709/223, 200
See application file for complete search history.

(56) References Cited

U.S. PATENT DOCUMENTS

| | | | |
|---|---|---|---|
| 6,049,819 A | | 4/2000 | Buckle et al. |
| 6,282,537 B1* | | 8/2001 | Madnick et al. ................ 707/4 |
| 6,370,542 B1* | | 4/2002 | Kenyon .................. 707/103 R |
| 6,564,196 B1* | | 5/2003 | Masuoka ..................... 706/45 |
| 6,640,231 B1* | | 10/2003 | Andersen et al. ............ 707/102 |
| 6,691,151 B1* | | 2/2004 | Cheyer et al. ............... 709/202 |
| 6,745,171 B2* | | 6/2004 | Masuoka ..................... 706/45 |
| 6,789,252 B1* | | 9/2004 | Burke et al. ................ 717/100 |
| 6,829,338 B2* | | 12/2004 | Gawande et al. ......... 379/112.1 |
| 6,845,380 B2* | | 1/2005 | Su et al. ..................... 707/102 |
| 6,996,800 B2* | | 2/2006 | Lucassen et al. ............ 717/106 |
| 7,047,243 B2* | | 5/2006 | Cabrera et al. ................ 707/10 |
| 7,062,253 B2* | | 6/2006 | Money et al. ............... 455/406 |
| 7,062,472 B2* | | 6/2006 | Dan et al. ..................... 705/80 |
| 7,139,551 B2* | | 11/2006 | Jamadagni ............... 455/412.1 |

FOREIGN PATENT DOCUMENTS

WO 02/073454 9/2002

OTHER PUBLICATIONS

Akinyele, "Multi-Agent System for DAML based Web Services", 2001, pp. 1-10.
Payne et al., "Browsing Schedules—An Agent-based approach to navigating the Semantic Web" The First International Semantic Web Conference (ISWC), 2002, pp. 1-5.
Denker et al., "Accessing Information and Services on the DAML-Enables Web", Proceedings of the SemWeb 2001, May 2001, pp. 1-11.
McIlraith et al., "Semantic Web Services", IEEE Intelligent Systems, Mar./Apr. 2001, pp. 46-53.

(Continued)

*Primary Examiner*—David Y Eng
(74) *Attorney, Agent, or Firm*—Greenblum & Bernstein, P.L.C.

(57) ABSTRACT

A platform for dynamic aggregation of user services includes an agent coordination logic module. The agent coordination logic module determines whether the implementation of an independent web service can be coordinated with the implementation of another independent web service to provide an enhanced web service. The agent coordination logic module dynamically coordinates implementation of the web service by an agent with the implementation of another web service by another agent according to ontological descriptions of the web service and the other web service.

24 Claims, 7 Drawing Sheets

OTHER PUBLICATIONS

Berners-Lee et al., "The Semantic Web", Scientific American, May 17, 2001.

A screen-shot of a website entitled "Web Services Agents for .Net", from <http://www.citi.qut.edu.au/research/plas/projects/web_services.jsp>, downloaded no later than Dec. 24, 2002.

A screen-shot of a website entitled "Web Services and Mobile Intelligent Agents", from <http:www.webservicesarchitect.com/content/articles/fou02.asp>, downloaded no later than Dec. 24, 2002.

* cited by examiner

COORDINATION PLATFORM AND METHOD FOR DYNAMIC AGGREGATION OF WEB SERVICES

BACKGROUND OF THE INVENTION

1. Field of the Invention

The present invention relates to the field of agents that implement services. More particularly, the present invention relates to a coordination platform for dynamically coordinating the implementation of independent services by agents in a communications network.

2. Background Information

A need exists to ensure independent services and agents that implement the independent services are coordinated so that a user realizes the full potential of agents and associated services available to the user. Presently, devices that support agents for processing information and communicating over a network are proliferating rapidly. However, a consumer is sometimes not able to understand the full capabilities of services supported on a networked device and, therefore, may not fully utilize the services.

Agents interact with users to provide execution of software services. Typically, an agent is a functional software module that controls a data storage memory, an instruction storage memory and a processor. The agent is associated with one or more services that perform tasks. However, agents are often designed to invoke service execution or otherwise implement stand-alone, independent, services that are not coordinated to provide an enhanced service, except when the coordination is pre-programmed as part of the service. Furthermore, agents have not previously been provided with an ability to independently coordinate services.

Accordingly, a coordination platform is needed to coordinate independent services and agents that implement the independent services. A need exists for a coordination platform that discovers and registers the services. A coordination platform is needed to dynamically coordinate execution of the services according to parameter information of the services. A coordination platform is needed to allow services that are independently developed to be coordinated using agent coordination logic. A coordination platform is needed to aggregate the benefits obtained from the implementation of multiple independent services.

To solve the above-described problems, a coordination platform is provided for dynamically coordinating the execution of multiple services by agents.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which.

DETAILED DESCRIPTION OF THE INVENTION

Figure 1:
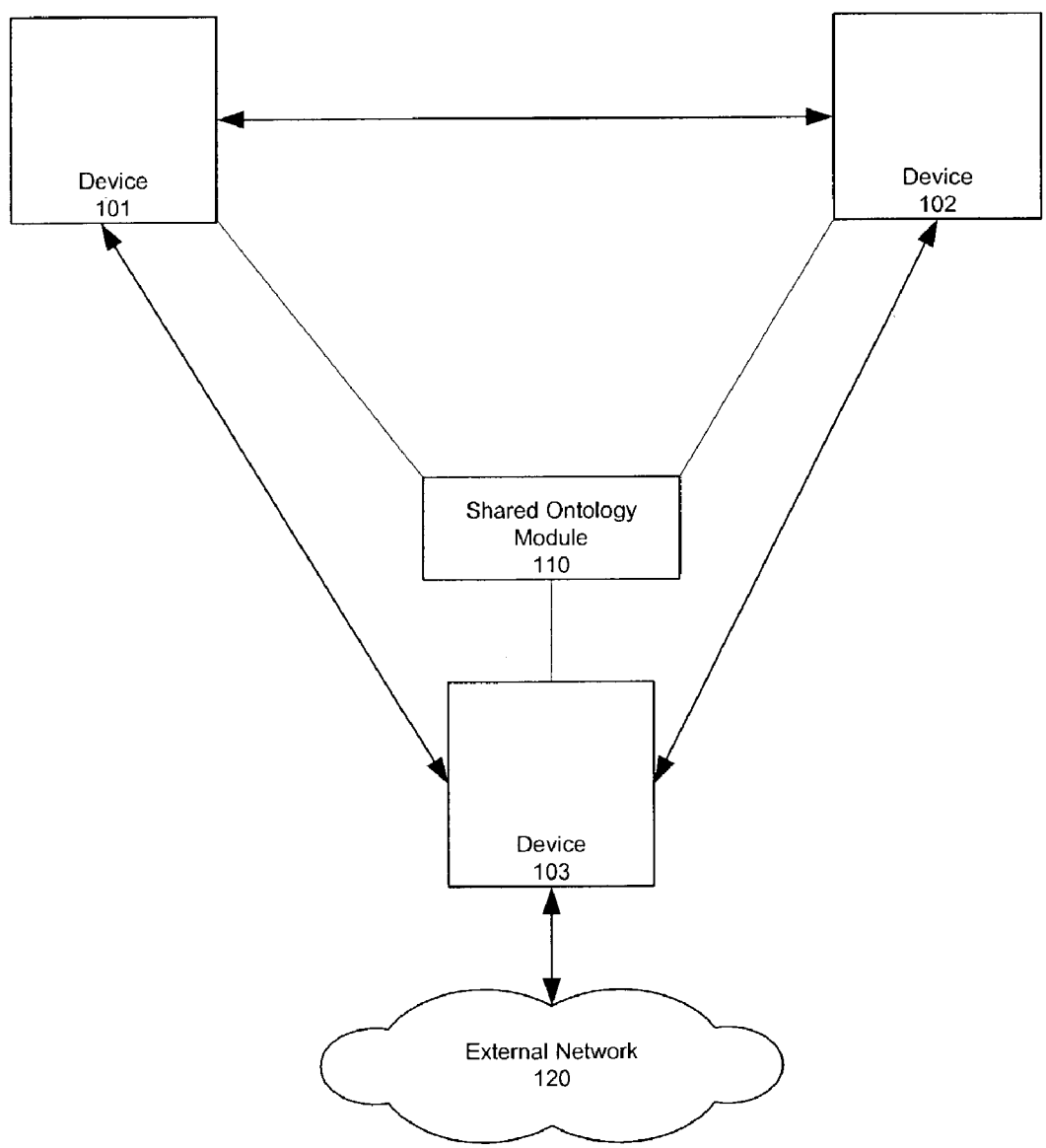
FIG. 1 shows an exemplary network architecture for the coordination platform for dynamic aggregation of services, according to an aspect of the present invention.

In view of the foregoing, the present invention, through one or more of its various aspects, embodiments and/or specific features or sub-components, is thus intended to bring out one or more of the advantages as specifically noted below.

In one aspect of the present invention, a platform for dynamic aggregation of user services is provided. The platform includes an agent that broadcasts a message when the agent implements an independent web service. The message includes information used to determine whether another web service is to be implemented.

In another aspect of the present invention, a platform for dynamic aggregation of user services is provided. The platform includes an agent coordination logic module that determines whether the implementation of an independent web service can be coordinated with the implementation of another independent web service to provide an enhanced web service. The agent coordination logic module dynamically coordinates implementation of the web service by an agent with the implementation of another web service by another agent according to ontological descriptions of the web service and the other web service.

In another aspect of the present invention, the platform includes a registration module that registers the service when the platform for dynamic aggregation of user services determines that the agent implementing the service is in the same domain as the platform for dynamic aggregation of user services.

In still another aspect of the present invention, the registration module registers the other service when the platform for dynamic aggregation of user services determines that the other agent implementing the other service is in the same domain as the platform for dynamic aggregation of user services. The service and the other service are only coordinated when they are both registered.

In yet another aspect of the present invention, the agent coordination logic module makes the determination by comparing the ontological description of the web service with the ontological description of the other web service.

According to another aspect of the present invention, a method of dynamically aggregating multiple services associated with multiple agents is provided. The method includes implementing a web service with an agent and implementing another web service with another agent. Ontological descriptions of the web service and the other web service are determined according to a shared ontology. Execution of the web service is dynamically coordinated with the other agent according to the determined ontological descriptions.

According to another aspect of the present invention, an agent coordination logic module is associated with the agent. A determination is made whether the implementation of the web service can be coordinated with the implementation of the other web service.

In still another aspect of the present invention, a determination is made whether the web service can be supplemented with the other web service.

In yet another aspect of the present invention, a determination is made whether the web service and the other web service can be used to provide an improved web service.

In another aspect of the present invention, an improved web service is provided that aggregates the web service and the other web service based on the dynamically coordinated execution of the web service.

In still another aspect of the present invention, a registration module is associated with the agent. A notification related to the implementation of the other web service is received at the agent. The other web service is registered using the registration module.

In yet another aspect of the present invention, the dynamic coordination of the execution of the web service automatically occurs independent of a user direction to coordinate execution of the web service.

In still another aspect of the present invention, at least one descriptive language used to describe the web service and the other web service is defined.

In another aspect of the present invention, the ontological description of the web service is forwarded from a shared ontology module to the other agent. A determination is made whether implementation of the web service and the other web service can be coordinated.

In an aspect of the present invention, a computer readable medium is provided for storing a computer program that dynamically aggregates multiple services associated with multiple agents. The computer readable medium includes a first web service implementing source code segment that implements a web service and a second web service implementing source code segment that implements another web service. An ontological determination source code segment determines ontological descriptions of the web service and the other web service according to a shared ontology. An execution coordination source code segment dynamically coordinates execution of the web service and the other web service according to the determined ontological descriptions.

In another aspect of the present invention, an agent coordination source code segment associates an agent coordination logic module with an agent. An implementation determination source code segment determines whether the implementation of the web service can be coordinated with the implementation of the other web service.

In yet another aspect of the present invention, a web service supplement source code segment determines whether the web service can be supplemented with the other web service.

In still another aspect of the present invention, a web service improvement source code segment determines whether the web service and the other web service can be used to provide an improved web service.

In another aspect of the present invention, a dynamic coordination source code segment provides an improved web service that aggregates the web service and the other web service based on the dynamically coordinated execution of the web service.

In yet another aspect of the present invention, a registration association source code segment associates a registration module with an agent. A notification source code segment receives, at the agent, a notification related to the implementation of the other web service. A registration source code segment registers the other web service using the registration module.

In still another aspect of the present invention, the execution coordination source code segment automatically coordinates the execution of the web service independent of a user direction to coordinate execution of the web service.

In yet another aspect of the present invention, a language description source code segment defines at least one descriptive language used to describe the web service and the other web service.

In still another aspect of the present invention, a description forwarding source code segment forwards the ontological description of the web service from a shared ontology module to an agent. An implementation determination source code segment determines whether implementation of the web service and the other web service can be coordinated.

An agent is supported as a functional module on a device that provides a processor and storage mediums for data and instructions. An agent coordination platform for dynamic aggregation of services is provided with agent coordination logic to coordinate multiple services, e.g., web services, that are implemented by at least one agent. The agent coordination platform includes agent coordination logic to dynamically coordinate the agent(s) and services associated with the agent(s). The agent coordination platform also uses a shared ontology so that agent coordination platforms and multiple agents interpret service information according to a common understanding of the services.

The agent coordination logic of the agent coordination platform may be provided with each device that supports an agent, with each agent, or may be provided in a separate module in a network. Additionally, a shared ontology module may be provided with each device or may be provided in a separate module.

Figure 2:
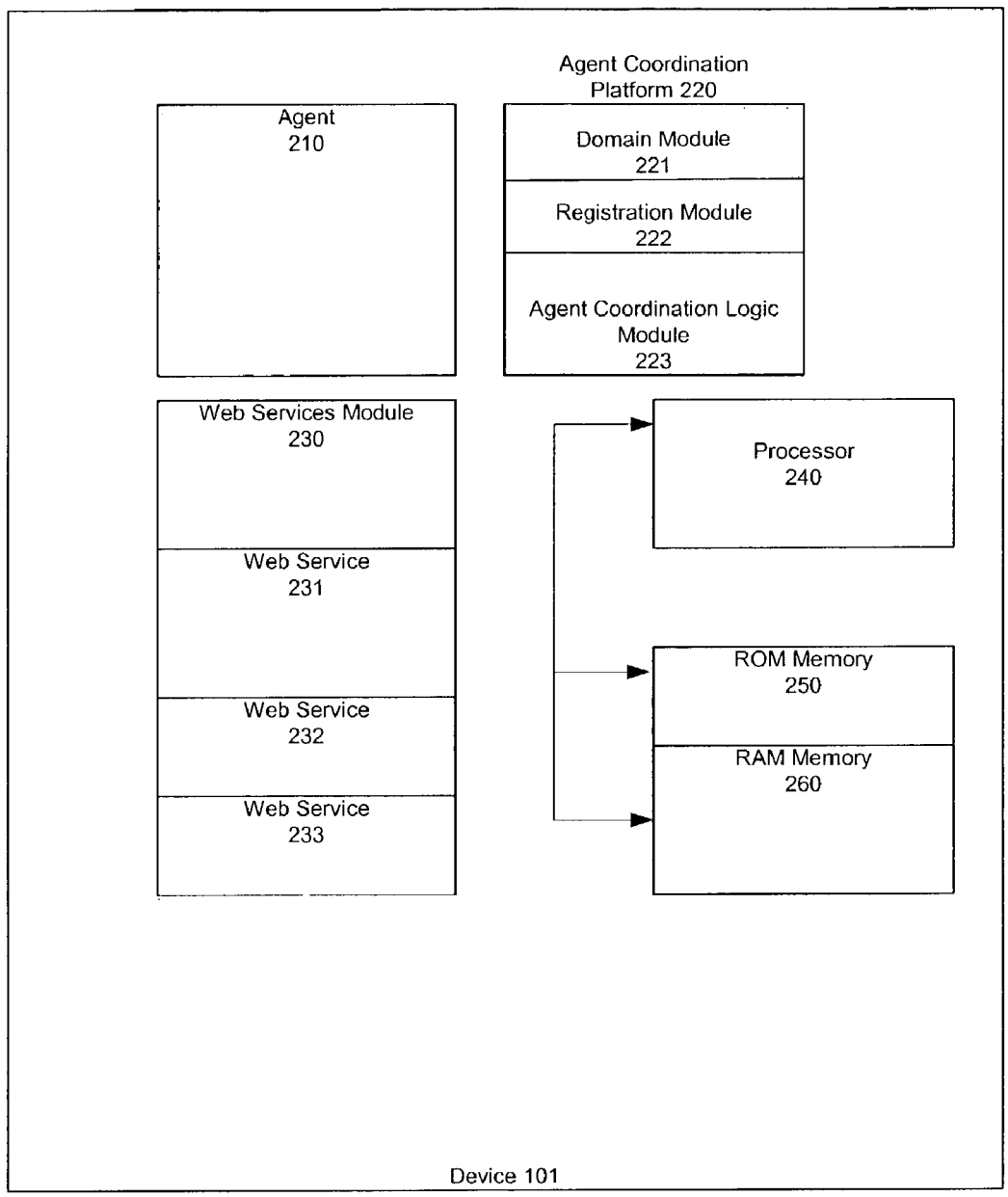
FIG. 2 shows an exemplary device architecture for the coordination platform for dynamic aggregation of services, according to an aspect of the present invention.

FIGS. 1 and 2 show an exemplary communications network that supports the agent coordination platform of the present invention. The devices 101, 102 and 103 support agents 210 that communicate using the network, agent coordination platforms 220 of software modules, and web services modules 230 containing services. The agents 210 on the devices 101, 102 and 103 implement services for a user. The agents 210 and agent coordination platforms 220 on the devices 101, 102 and 103 utilize a shared ontology module 110 to ensure that services are consistently understood by each agent 210 and agent coordination platform 220. The device 103 also communicates externally using an external network 120.

The agents 210 on the devices 101, 102 and 103 communicate with each other using an agent communications language (ACL). Agent communications languages include, e.g., knowledge query and manipulation language (KQML), or the foundation for intelligent physical agent (FIPA) languages, such as java agent development framework (JADE)/lightweight extensible agent platform (LEAP). The agent communications languages allow standardized communications for agent-based software platforms.

The services implemented by the agents 210 are built using, e.g., a hyper text markup language (HTML), an extensible markup language (XML) or the defense advanced research projects agency (DARPA) agent markup language (DAML). Furthermore, services may be built using a web services description language (WSDL) based on, for example, an XML vocabulary.

As an example, the services that are implemented by the agents 210 on the devices 101, 102 and 103 may be web services. For example, a personal computer supports an agent 210 that implements a notification service that interfaces with a backend messaging system and relays notifications to multiple devices, e.g., a personal digital assistant in a home networking domain. The agent 210 on the personal computer may also implement a graphical user interface (GUI) to enable the user to view graphics. As another example, a set-top box supports an agent 210 that implements a playback service that provides a video display on a television monitor and an audio component on speakers. As yet another example, a personal digital assistant (PDA) supports an agent 210 that implements a location service that obtains a location of the personal digital assistant using sensors at various locations.

Web services may be implemented with mechanisms to specify coordination with other specified web services. In other words, each web service may specify mechanisms for coordination with other web services to form, in effect, an enhanced web service. However, the agent coordination platforms 220 coordinate the implementation of, e.g., two web services, if neither specifies mechanisms for coordination.

The shared ontology module 110 defines an ontology of representational terms with axioms that govern interpretation of each term, as well as text that describes the terms. The representational terms are defined in a declarative language using axiomatic rules, e.g., a taxonomy and a set of inference rules. The axioms of the shared ontology define the relationship between two related terms. The shared ontology is used to guarantee that agent coordination platforms 220 and multiple agents 210 are provided with a common interpretation of representational terms, e.g., using the same language and vocabulary or a set of languages with overlapping but non-identical vocabulary. In the case of overlapping ontologies, the shared ontology module 110 may determine that the specific ontological descriptors used to describe multiple services are understood the same way in each ontology, i.e., in an area of overlap.

The shared ontology module 110 includes a library of concepts, i.e., nouns, used to define features of a service according to an ontology. Each ontological concept of a service is associated with action terms, i.e., verbs, used to define actions that can be performed by the service. The shared ontology module 10 may be provided on any or all of the devices 101, 102 and 103, or may be provided on another device (not shown) in the network. The shared ontology module 110 may also include multiple libraries for multiple ontologies. In the case of different, but overlapping, ontologies, the shared ontology module 110 ensures that the specific ontological descriptions that describe different services are understood to have the same meaning.

As an example, for the notification service noted above, the ontological concept can be, e.g., is -notification-, with sub-concepts of -from-, -text- and -attachment-. In the example of the playback service, the concepts can be, e.g., -audio- and -video-, each with the subconcepts -track-, -title-, and -album-, as well as two verbs -play- and -download-. In the example of the location service, the ontological concepts can be, e.g., -location- and -get-.

In an embodiment, the shared ontology module 110 examines and defines services according to a content markup language. The shared ontology module 110 may be used to translate and encode concepts and subconcepts related to the services to be implemented by an agent 210. When a service is installed on a device in the domain of the shared ontology module 110, the shared ontology module 110 encodes an ontological description of the service according to an ontology used by the agent coordination platforms 220 and agents 210 coordinated by the agent coordination platforms 220. Accordingly, the agent coordination platforms 220 and the multiple agents 210 using the shared ontology module 110 will implement services described consistently by the shared ontology module 110. As an example, an ontological XML-based description of the services may be generated by the shared ontology module 110, forwarded to the agents 210 on the devices 101, 102 and 103, and used by the agent coordination platforms 220 on the devices 101, 102 and 103 to dynamically coordinate the execution of the services.

Accordingly, using the shared ontology module 110, the agents 210 and agent coordination platforms 220 supported by the devices 101, 102 and 103 consistently interpret and understand services implemented by the agents 210, and are enabled to enhance the services or create additional services when the agent coordination platforms 220 determine that the enhancement of an existing service or creation of a new service is possible and desirable.

In an embodiment, the shared ontology module 110 examines a web service using an introspection technology, e.g., available in Java and C#, to determine ontological descriptions of the web service.

In another embodiment, self-describing web services are provided. A shared ontology module 110 is unnecessary when web services are self-described according to a common or overlapping ontology. In other words, web services may be self-described by the time they are introduced into the domain of an agent coordination platform so that a shared ontology module 110 is not necessary. When a shared ontology module 110 is not provided and the agent coordination platforms 220 does not recognize the ontological descriptors used to describe a self describing web service, the agent coordination platforms 220 will, e.g., not coordinate implementation of the web services.

FIG. 2 shows an exemplary device architecture of the device 101 shown in FIG. 1. The exemplary device architecture of the device 101 is also representative of the device architecture of the devices 102 and 103. The device 101 supports an agent coordination platform 220 that includes a domain module 221, a registration module 222 and an agent coordination logic module 223. The device 101 also supports an agent 210 and a web services module 230 with the web services 231, 232 and 233. Additionally, the device 101 includes a processor 240, ROM memory 250 and RAM memory 260.

The agent 210 on the device 101 generates signals to the agents 210 on the devices 102 and 103. Additionally, the agent 210 on the device 101 interprets signals received from the devices 102 and 103. The web services 231, 232 and 233 have specifications, e.g., properties, capabilities and relationships, that are described for the agent coordination platform 220 by ontological terms determined by the shared ontology module 110.

The domain module 221 determines the domain of an agent 210, or the allowable domain of use of the service implemented by an agent 210, that contacts the agent 210 supported by the device 101. For example, in a home network the device 101 may belong to a home domain for Rutherford Hayes. Multiple additional devices also belong to the home network of Rutherford Hayes. A networked television with a set-top box, a refrigerator, a microwave oven, a laptop computer, a personal computer, a wireless cell phone, a wireline phone, and other devices and appliances may all be networked in the domain.

In an embodiment, agents 210 on each of the networked devices and appliances in Rutherford's domain may periodically send out a, e.g., wireless, registration signal on a local control channel. However, the local control channel may also be monitored by devices and appliances in another domain, such as a neighbor's domain. If the neighbor's devices and appliances receive the registration signal for Rutherford's device or apparatus, the devices and appliances of the neighbor's domain must determine that Rutherford's devices and appliances are not in the same domain so that services supported by Rutherford's devices are not subject to coordination with services supported by the neighbor's devices.

Accordingly, Rutherford's devices and appliances may be preprogrammed with domain information before or during an initial installation. As additional agents 210 and services are installed on Rutherford's devices and appliances, they are also provided with domain information. When a new agent 210 or an agent 210 with a new service initiates contact with the agent 210 on the device 101, the agent 210 on the device 101 refers the initiating agent 210 to the domain module 221 to determine the intended domain of use of the new agent or service. As a result, when Rutherford's neighbor, James Garfield, buys a new smart microwave and the new microwave offers to cook food via remote web instructions from a device in Rutherford's home domain, Rutherford's domain module 221 will determine that the new microwave is not available to Rutherford Hayes, and should not be registered as a service resource by the agent coordination platform 220.

The registration module 222 registers each of the web services 231, 232 and 233 when they are installed on the device. Additionally, the agent 210 on the device 101 receives a broadcast notification of a newly installed service implemented by an agent 210 on the device 102 or 103, e.g., once the newly installed service is installed on the device 102 or 103 and once the newly installed service is registered by a corresponding agent coordination platform 220 on the device 102 or 103. The service implemented by the agent 210 on the device 102 or 103 is then registered by the registration module 222 on the device 101. Additionally, an announcement of the availability of a service implemented by the agent 210 on the device 101 is broadcast within the domain by the agent 210, e.g., once the service is installed on the device 101 and once the service is registered by the registration module 222. Accordingly, the agent coordination platform 220 registers information of multiple services associated with agents on the devices 101, 102 and 103.

In another embodiment, the registration module 222 is not provided and the agent 210 on the device 101 broadcasts information, e.g., of a service being implemented by the agent 210 or to request help from other agents 210 in the domain. The ontological descriptors are broadcast on an as-needed or an as-implemented basis at run-time by the agent 210 in order to provide additional adaptivity. Accordingly, in the example of a request for help, the ontological descriptors of the requested service are broadcast by the agent 210 at run-time when a need arises.

Where the registration module 222 is provided, the registration module 222 may also indicate which device supports each of the registered services. Additionally, the registration module 222 on the device 101 may indicate whether each registered service is primarily the responsibility of another agent coordination platform 220 on the devices 102 or 103. Since registration modules 222 may be provided for the devices 102 and 103, the responsibility for registering and coordinating services may be apportioned among the devices 101, 102 and 103. The registration module 222 on each device 101, 102 and 103 will record which of the devices 101, 102 and 103 supports each particular registered service.

The agent coordination logic module 223 on the device 101 coordinates implementation of the services implemented by the agent 210 on the device 101, both with other services implemented by the agent 210 on the device 101, as well as with the services implemented by the agents 210 on the devices 102 and 103. In other words, the agent coordination logic module 223 may be used to coordinate the operation of multiple agents 210 associated with multiple services.

When the agent coordination platform 220 arranges to register the newly installed service with the registration module 222, the agent coordination logic module 223 will determine the functionality of the newly installed service by an ontological examination of the description of the newly installed service. Additionally, the ontological description of the newly installed service is compared with the ontological description of existing services registered in the registration module 222. The agent coordination logic module 223 examines the ontological descriptors of the newly registered service and compares the ontological description of the newly registered service with the ontological descriptions of other services that are already registered in the registration module 222. As an example, the agent coordination logic module 223 may receive a service marked-up in a WSDL ontology. The agent coordination logic module 223 parses and retrieves the ontological descriptors of the WSDL service to compare with the ontological descriptors of the services previously registered by registration module 222. Accordingly, the agent coordination logic module 223 determines whether a service may be used to enhance another service, or whether the functionality of two services can be combined to create a new service.

The agent coordination logic modules 223 on the devices 102 and 103 will perform a similar examination and comparison. As a result, the agent coordination platform 220 on the devices 102 and 103 will also determine whether any services implemented by the agents 210 on the devices 102 and 103 may be used to enhance a newly registered service, or vice versa.

As an example, a newly installed service may have a markup language descriptor that describes a playback service of a set-top box with two concepts, -music- and -video-. Additionally, the playback service may be described by two action terms, -play- and -download-. By performing an ontological examination and comparison, the agent coordination logic module 223 on the device 101 (or the agent coordination logic module 223 on the devices 102 or 103) determines that an email service implemented by the agent 210 on the device 101 (or by an agent on the devices 102 or 103) also is described by the same ontological concepts and action terms.

Thus, the agent coordination logic module 223 will determine that the new set-top box playback service may be used to enhance the email service when, for example, the computer on which the email service account exists is dormant. As a result, the agent coordination logic module 223 may offer to enhance the set-top box functionality with email service so that, for example, a new email to Rutherford is displayed on a television monitor controlled by the set-top box when Rutherford's computer is not active.

In another embodiment, the agent coordination logic module 223 may store ontological descriptors for services that are not yet installed in the network domain. For example, when an email is received with an attachment of content that cannot be opened or displayed on a computer, the agent coordination logic module 223 on the computer may determine that the attachment should be examined by the shared ontology module 110 to determine ontologically descriptive terms of the attachment. Once the agent coordination logic module 223 compares the ontological description of the attachment with the ontological descriptions of registered services, and determines that none of the registered services in the domain will support viewing the attachment, the agent coordination logic module 223 may store the ontological descriptive terms in an associated memory to indicate that any service installed in the domain in the future that supports viewing the attachment would enhance the functionality of the network.

Of course, many additional services could be enhanced by the agent coordination logic modules 223. The agent coordination logic module 223 of the agent coordination platform 220 on the device 101 may enhance services of the set-top box with functionality of services on the computer. For example, when Rutherford stores a "preferred" list of television programming using a service implemented on the set-top box, the agent coordination logic module 223 on the set-top box may determine that Rutherford may wish to receive an email, using an email service, when he is online to notify him that a favored television show is starting.

Accordingly, the agent coordination logic module 223 uses an ontological comparison to determine that different services can be enhanced by examining the ontologically descriptive terms that describe the newly installed service and comparing the ontologically descriptive terms with ontological descriptions of the services already registered by registration module 222. Of course, the agent coordination logic module 223 does not have to search for an exact match of descriptive terms. The agent coordination logic module 223 may search for related terms of services on any other basis that might describe a newly registered service that can be used to enhance a previously registered service and vice versa. Additionally, the agent coordination logic module 223 may be preprogrammed to search for specific ontological descriptors of services with specifications that would enhance existing services. Accordingly, the agent coordination platform 220 uses the agent coordination logic module 223, the registration module 222 and the domain module 221 to dynamically coordinate execution of multiple services according to the specification information of the services as described by the shared ontology module 110.

In another embodiment, agents 210 use Juxtapose (JXTA) discovery to discover peers and resources (services). JXTA is an open-source peer discovery resource protocol where each participating device in a domain can be addressed as a peer. The agents 210 use JXTA peer discovery to dynamically discover other agents 210. Additionally, the agents 210 on devices in a domain can use JXTA resource discovery to discover the services that each agent 210 in the domain offers.

Additionally, JXTA can be used by agents 210 to forward information from one domain to another. Accordingly, where services in other domains can be utilized or retrieved at the behest of the agent coordination platform 220, the agent coordination platform 220 coordinates the implementation of services associated with agents 210 in the other domains.

In an embodiment, a virtual domain is organized to include a group of devices. As an example, a JXTA group may be organized in a virtual domain. A JXTA scoping mechanism is used to scope a domain according to a registration module that registers the agents of the JXTA group.

Of course, a resource discovered by JXTA must be ontologically described by the shared or overlapping ontology in order to be coordinated by the agent coordination platform 220. If an ontological description according to the shared ontology has not yet been performed for the discovered service, the discovered service is retrieved and subjected to the shared ontology module 110. Additionally, the domain module 221 may be used to ensure that coordination of the service from the domain of the agent coordination platform 220 is appropriate. If the service is authorized for use in the domain of the agent coordination platform 220, then the service is registered by the registration module 222, and subjected to ontological examination and comparison by the agent coordination logic module 223.

In another embodiment, if an ontological description already exists for the service, and if the domain module 221 determines that the agent coordination platform 220 is authorized to coordinate the service, then only the ontological description and registration information of the service are retrieved for the coordination to take place. Accordingly, the ontological description and the information used for registration may be retrieved for the agent coordination platform 220, registered by the registration module 222, and extracted and examined by the agent coordination logic module 223.

Accordingly, the agent coordination platform 220 can be used to coordinate services by subjecting the services that are described according to a common ontology to approval of the domain module 221, registration by the registration module 222, and ontological examination and comparison by the agent coordination module 223. Additionally, the agent coordination platform 220 can be used to coordinate services in the domain of the agent coordination platform 220, as well as services in another domain discovered by a peer discovery resource.

Figure 3:
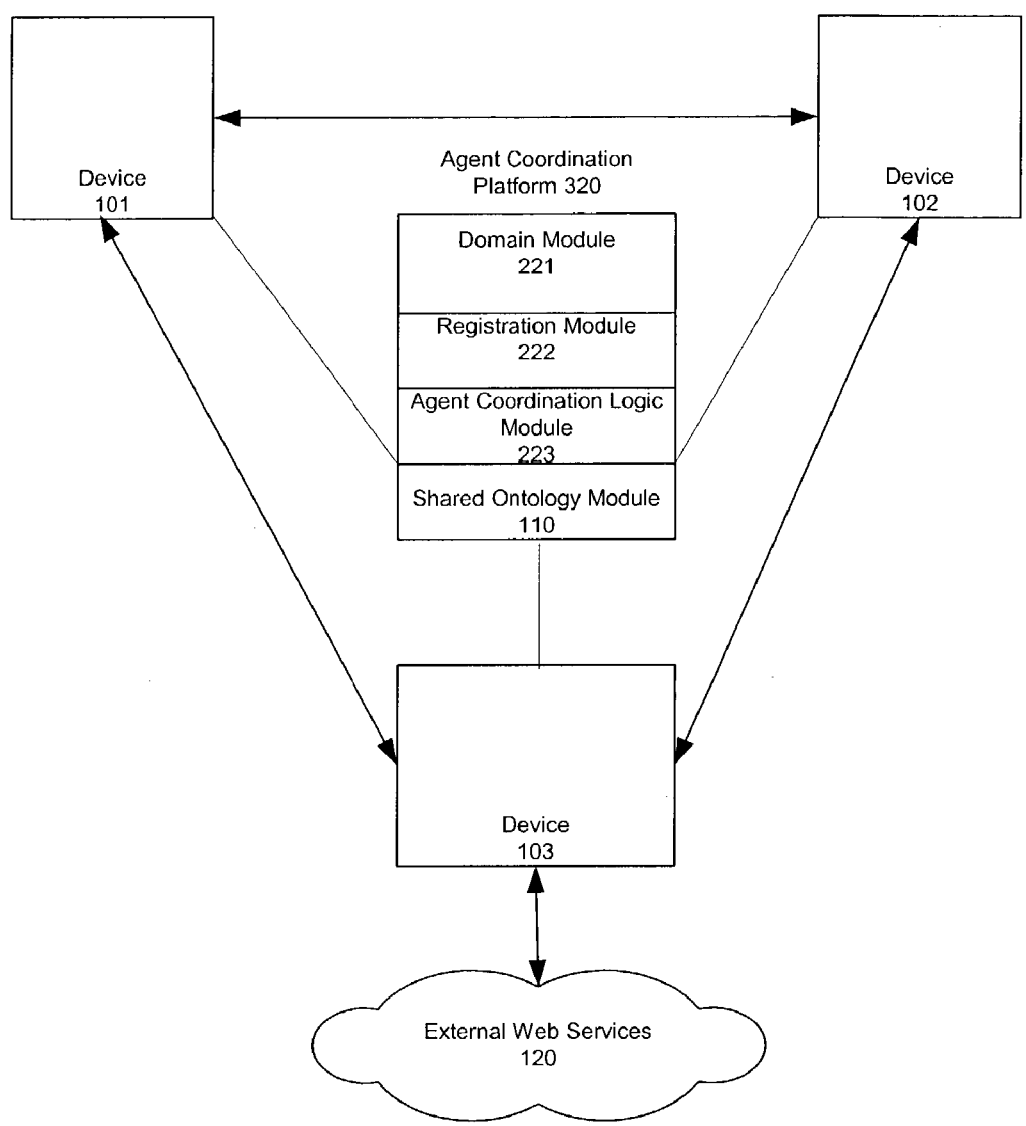
FIG. 3 shows another exemplary network architecture for the coordination platform for dynamic aggregation of services, according to an aspect of the present invention.

FIG. 3 shows another exemplary communications network of the present invention. Rather than having the agent coordination platform 220 dispersed among the devices 101, 102 and 103, an agent coordination platform 320 is provided centrally in the domain, with a domain module 221, a registration module 222 and an agent coordination logic module 223. The agent coordination platform 320 may need to be provided centrally where, for example, memory and processing constraints on a device prohibit the storage of data and instructions for the domain module 221, the registration module 222 and the agent coordination logic module 223. Additionally, the agent coordination platform 320 may be provided centrally so as to eliminate the duplication of efforts that occurs when a service is registered at multiple devices in, for example, a home network.

The shared ontology module 110 is included in the agent coordination platform 320 of FIG. 3. In an embodiment, the shared ontology module 110 examines service information for devices 101, 102 and 103 and ensures that markup language descriptors are applied consistently to any service that needs to be described, according to a common ontology, for the agent coordination logic module 223.

When a new service is installed on any of the devices 101, 102 and 103, the agent 210 that will implement the new service subjects the new service to the shared ontology module 110 of the agent coordination platform 320. After the shared ontology module 110 describes the service in ontologically descriptive terms, the domain module 221 determines the domain of use for the service. Additionally, the new service is registered by registration module 222. Once the new service is registered, the agent coordination platform 320 uses the agent coordination logic module 223 to examine and compare ontological descriptors, and to determine if any existing registered services may be enhanced by the newly registered service. If the new service can be used to enhance an existing service, or vice versa, the agent coordination logic module 223 may instruct the agent 210 that implements each service to notify the agent coordination logic module 223 in each case where either service is implemented so that the services can be enhanced. Accordingly, the agent coordination platform 320 may be centrally provided to dynamically coordinate the implementation of multiple independent services in a network.

Figure 4:
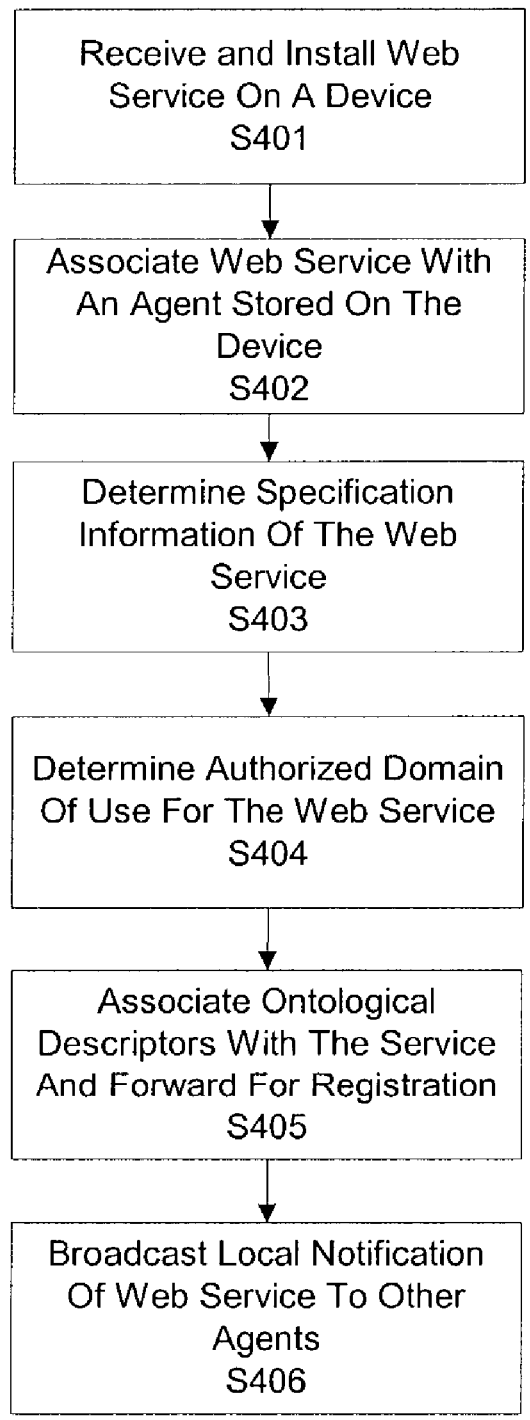
FIG. 4 is a flow diagram showing a method of implementing a service, according to an aspect of the present invention.

FIG. 4 shows an exemplary method of implementing a service in the domain of the agent coordination platform 220 described above. At S401, the service is received and installed on a device, e.g., the device 101. At S402, the web service is associated with the agent 210 on the device. The agent 210 determines that the service has been installed and requests the shared ontology module 110 to describe the service according to a common ontology. At S403, the shared ontology module 110 determines specification information of the service and generates descriptors of the concepts and actions of the service. At S404, the domain module 221 determines the authorized domain of use for the service according to the information provided with the service. Additionally, at S405, the ontological descriptors are associated with the service and forwarded to the registration module 222 for registration. After the registration module 222 registers the new service, the agent coordination platform 220 requests that the agent 210 broadcast within the domain an announcement of the availability of the new service at S406. Additionally, the agent coordination logic module 223 may, for example, parse and examine the ontological descriptors of the new service and determine if the descriptors match previously stored descriptors sought by the agent coordination platform 220.

Figure 5:
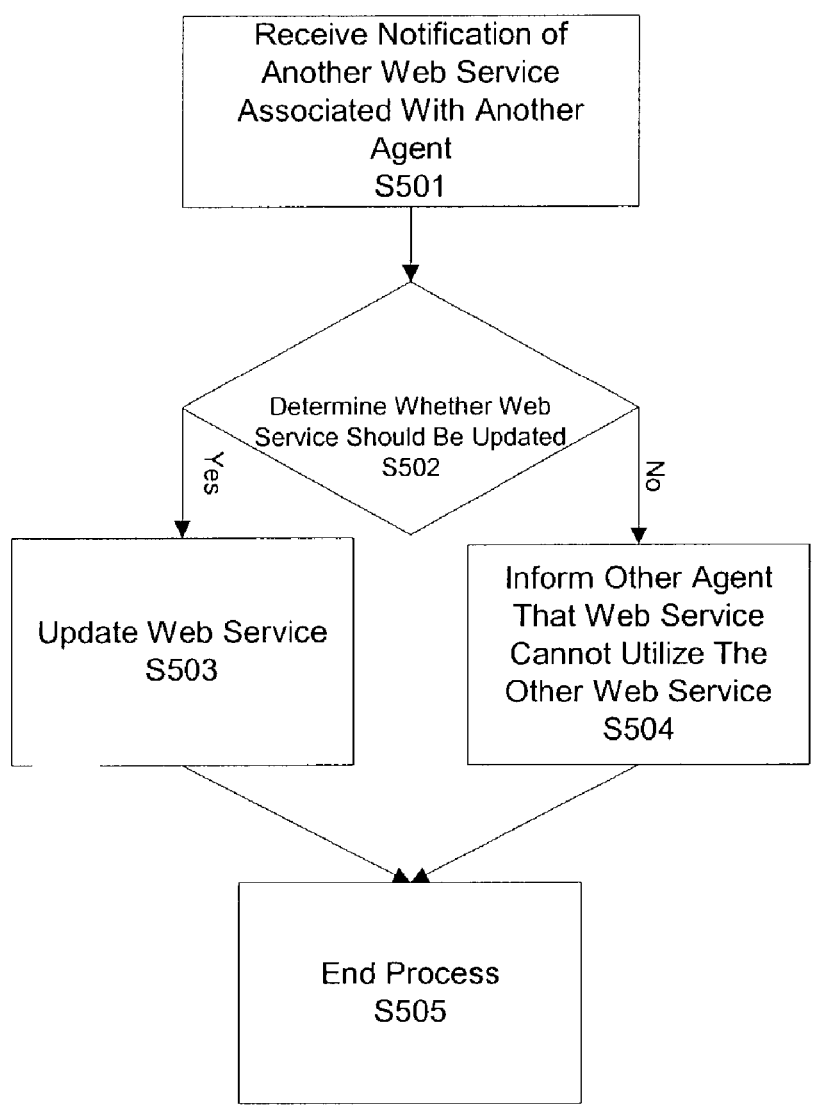
FIG. 5 is a flow diagram showing a method of determining whether a service can be improved by another service, according to an aspect of the present invention.

FIG. 5 shows an exemplary method of determining whether a service can be improved by another service. At S501, a notification is received at, for example, the agent 210 supported on the device 101. The received notification indicates that a service is available for implementation by another (sending) agent 210. At S502, a determination is made, at the agent coordination logic module 223, whether any services available from the receiving agent 210 on the device 101 can be updated or enhanced using the newly available service. For example, the agent coordination logic module 223 on the device 101 may examine the ontological description of the newly available service and compare the ontological description with descriptions of services that are already registered by the registration module 222.

If none of the registered services available from by the receiving agent 210 can be updated or enhanced by the newly registered service, then the receiving agent 210 signals the sending agent that the newly available service cannot be utilized by an existing service at S504 and the process ends at S505. However, if a registered service available from the receiving agent 210 can be updated or enhanced by the newly registered service, the ontological descriptors of the newly registered service are used to update the description of the existing service at S503. For example, the ontological description of the existing service may indicate that a particular action to be taken by the existing service can be performed using the newly registered service under certain conditions. After updating the existing service at S503, the process ends at S505.

Figure 6:
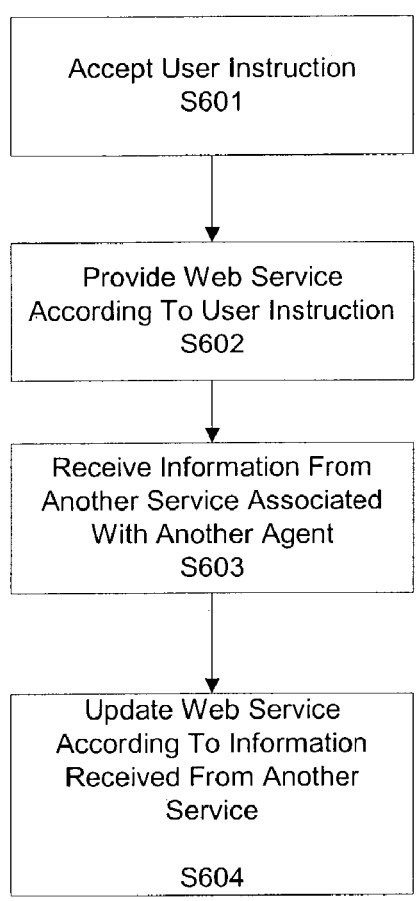
FIG. 6 is a flow diagram showing a method of coordinating services, according to an aspect of the present invention.

FIG. 6 shows an exemplary method of providing coordinated services. At S601, a user instruction is accepted at, for example, the device 101. The service is implemented according to the user instruction at S602. At S603, information is received from another agent that implements another service. At S604, the service being provided is updated according to the information received from the other service.

As an example of the method shown in FIG. 6, the device 101 may be a personal digital assistant (PDA) having the agent 210 implement a service that broadcasts Rutherford's location. The agent 210 on the PDA 101 also implements a service that updates a graphical user interface (GUI) on the PDA 101 to display information from additional services implemented by other agents on the other devices 102 and 103. Of course, the additional services are registered with the registration module 222 on the PDA 101. The device 102 is a set-top box with an agent that implements a web-enabled digital television (video and audio) service. Additionally, the device 103 is a personal computer (PC) with an agent that implements web-enabled video and audio services.

Rutherford instructs the set-top box 102 to implement the web-enabled video service and selects a music channel. When Rutherford changes location from the room with the set-top box 102 to the room with the personal computer 103, the set-top box 102 receives a notification from the PDA 101 that Rutherford's location has changed. The set-top box 102 instructs the personal computer 103 to display the music channel using the web-enabled video and audio services of the personal computer 103. Accordingly, the information received at S603 from the agent that implements the location service on the PDA 101 is used to update the web-enabled video service implemented by the agent on the set-top box at S604 when Rutherford changes location. Thus, the music channel display follows Rutherford as he moves from one room into another room.

Figure 7:
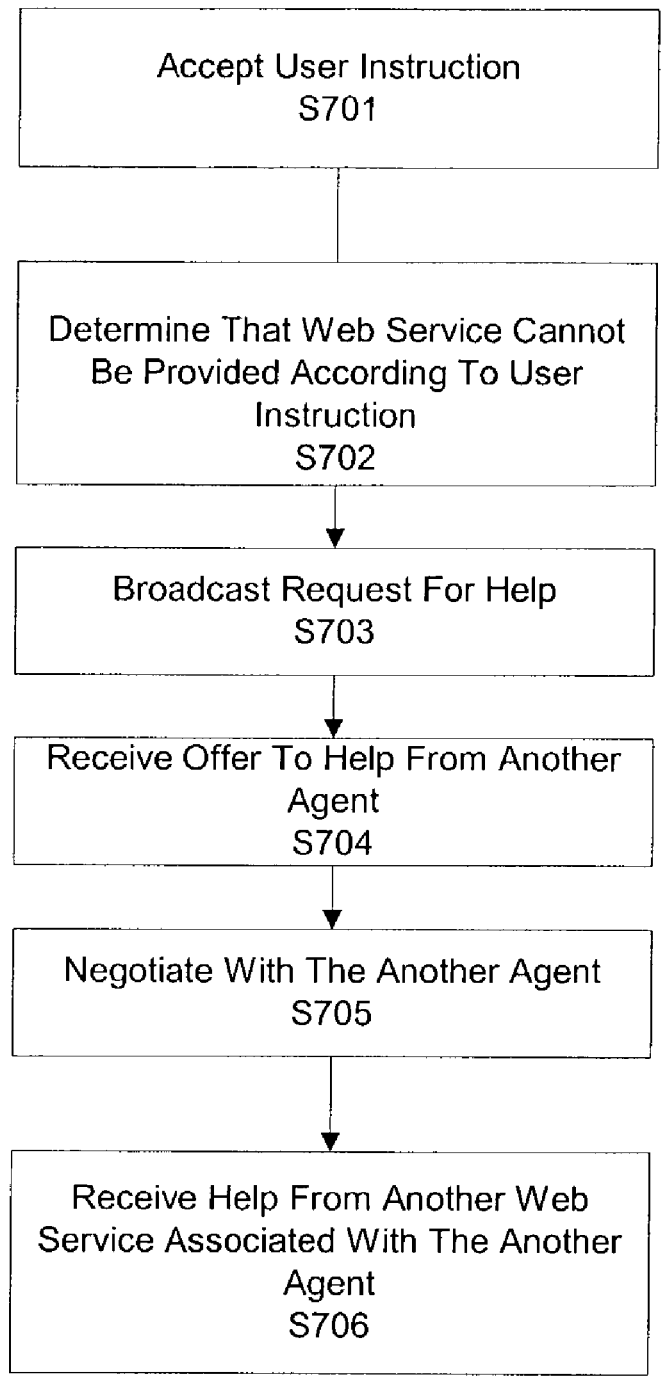
FIG. 7 is a flow diagram showing a method of obtaining assistance from another service when a user instruction cannot be completed by a designated service, according to an aspect of the present invention.

FIG. 7 shows an exemplary method of obtaining assistance from another service when a user instruction cannot be completed by a designated service. At S701 the agent 210 on the device 101 accepts a user instruction to implement a service. At S702 the agent 210 determines that the service cannot be implemented in accordance with the user instruction. At S703, the agent 210 broadcasts a request for help within the domain, including ontological descriptors of the instruction and ontological descriptors of the service abilities already available. At S704, another agent responds by offering to help. At S705, the agent 210 negotiates assistance with the other agent, and at S706 the agent 210 receives the help from a service implemented by the assisting agent.

As an example of the method shown in FIG. 7, the device 101 is a PDA as described above, with an agent that broadcasts Rutherford's location. The PDA 101 also implements a coordinated service that updates a graphical user interface to display notifications of an email service relayed from the PC 103. The PDA 101 receives a message from James Garfield with an attached URL. However, the URL links to a video clip and the PDA 101 does not have a service for playing video. At S703, the agent 210 on the PDA 101 broadcasts a request for help along with ontological descriptors of what type of service (video) is required. At S704, an agent 210 on the set-top box 102 signals an offer to help. The PDA 101 signals the set-top box 102 that Rutherford is in the room with the television monitor at S705. The set-top box accesses the URL, obtains the video clip, and plays the video for Rutherford at S706. Accordingly, when the device 101 determines that a service is needed to complete a user instruction, the agent coordination platform 220 obtains necessary assistance from a service implemented on another device.

In yet another example of a method of dynamically coordinating services, the device 102 is a PC with an agent that implements a service for finding and retrieving recipes when Rutherford provides an ingredient list. The recipe finder service was created with the intent that it be used on a peer-to-peer basis on the internet. Accordingly, other internet users can send a simple object access protocol (SOAP) message to the recipe finder service to, for example, retrieve a copy of the service. Rutherford also has a web-enabled refrigerator 101 with sensors that read bar codes on items as they are placed in, and removed from, the refrigerator 101. The information of the bar coded items is collected by the agent 210 in the refrigerator 101. When the bar coding service on the refrigerator was installed in the network, a description of the bar coding service was broadcast using the agent coordination platform 220 of the refrigerator 101. Using the ontological descriptions of the services, the agent coordination platform (not shown) of the PC 102 determined that the recipe finder service could be enhanced with the service that lists food items stored in the refrigerator 101. The recipe finder service was updated to reflect that recipes could be retrieved using the food-listing service of the refrigerator 101.

Rutherford also has a PDA 103 with a web-enabled speech recognition service. Accordingly, when Rutherford asks the PDA 103 "what can I make for dinner", the agent coordination platform (not shown) of the PDA 103 uses the ontological description of the request to determine that Rutherford wishes to retrieve food titles corresponding to recipes that are possible with an input list of food. Since the PDA 103 does not have a list of food or a recipe-finding service, the PDA 103 broadcasts within the domain a request for help using the ontological description of the request. The agent coordination logic module (not shown) on the PC 102 recognizes the description as a request for recipes and offers to implement the recipe retrieval service for Rutherford. When Rutherford agrees to use the recipe retrieval service on the PC 102, the PC 102 implements the modified recipe retrieval service to obtain a list of the ingredients in the refrigerator 101. The PC 102 then searches for recipes that can be used with the ingredients in the refrigerator and returns potential recipes to the PDA 103 for Rutherford to review. Accordingly, the recipe retrieval service is updated and the PDA 103 receives responses to a request for help using ontological examination and comparison of the agent coordination platform (not shown) of the PDA.

Accordingly, the agent coordination platform reasons about services using a common ontology. The agents are enabled to dynamically discover other agents and services within an appropriate domain, and use a shared ontology to communicate using asynchronous messages in an agent communications language. The agent coordination platform allows the aggregation and enhancement of services in manners not contemplated by the original service creators. The agent coordination logic in, for example, the agent coordination module 223, is independent of any particular agent or service implementation. Additionally, the registration of services and the determination of appropriate domains of use for each service and agent are independent of any particular agent.

Thus, according to the architecture diagrams of FIGS. 1-3 and the flow diagrams of FIGS. 4-7, the agent coordination platform and method ensure that services are fully utilized in a user domain. As should be clear, the processes shown in the flow diagrams of FIGS. 4-7 can be performed in a different order. Additionally, as should be clear, the agent coordination platform dynamically coordinates one or more agents that implement multiple services. Moreover, additional processes can be performed to determine whether multiple services can be enhanced to aggregate the services provided to a user using the agent coordination platform as described herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For example, the agent coordination platform may include a single agent coordination platform installed on a single device, or the agent coordination platform may include multiple agent coordination platform modules installed on multiple devices.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for agent communications languages (e.g., KQML, FIPA protocol compliant, JADE/LEAP), service formats (e.g. XML, HTML, WSDL), and peer to peer discovery (JXTA). represent examples of the state of the art. Such standards are periodically superseded by faster or more efficient equivalents having essentially the same functions. Accordingly, replacement standards and protocols having the same functions are considered equivalents.

What is claimed is:

1. A communications platform, comprising:

a first device having a first agent, for implementing a first independent web service, broadcasting a request for help, when a user instruction cannot be completed by the first independent web service;

a second device having a second agent, for implementing a second independent web service, responding to the broadcast for help;

a module for providing ontological descriptions of the web services to be implemented on the first and second devices;

an agent coordination platform, responsive to the module for providing ontological descriptions, and configured to determine whether the implementation of the first independent web service can be coordinated with an implementation of the second independent web service, the agent coordination platform being further configured to dynamically coordinate the implementation of the first independent web service by the first agent with the implementation of the second independent web service by the second agent according to an ontological description of the first independent web service and an ontological description of the second independent web service;

wherein the agent coordination platform obtains assistance from the second agent and the second independent web service to complete the user instruction on the second device.

2. The communications platform of claim 1, wherein the agent coordination platform is configured to make the determination by comparing the ontological description of the first independent web service with the ontological description of the second independent web service.

3. The communications platform of claim 1, wherein the communications platform is implemented on an apparatus with one of the first agent and the second agent.

4. The communications platform of claim 1, wherein the agent coordination platform dynamically coordinates the independent web services by subjecting the independent web services to at least one module selected from a group consisting of a domain module, registration module and agent coordination logic module.

5. The communications platform of claim 4, the registration module configured to register the first independent web service when the communications platform determines that the first agent implementing the first independent web service is in the same domain as the communications platform.

6. The communications platform of claim 5, wherein the registration module is further configured to register the second independent web service when the communications platform determines that the second agent implementing the second independent web service is in the same domain as the communications platform.

7. The communications platform of claim 6, wherein the first independent web service and the second independent web service are coordinated only when they are both registered.

8. The communications platform of claim 1, wherein the onto logical description of the first independent web service and the ontological description of the second independent web service are each encoded according to a shared ontology using ontological descriptors of characteristics of the first independent web service and the second independent web service respectively.

9. A method of coordinating web services, the method comprising:
obtaining an onto logical description of a first independent web service implemented by a first agent;
obtaining an onto logical description of a second independent web service implemented by a second agent;
determining whether the implementation of the first independent web service can be coordinated with the implementation of the second independent web service; and
dynamically coordinating the implementation of the first independent web service with the implementation of the second independent web service according to the ontological description of the first independent web service and the ontological description of the second independent web service;
wherein when a user instruction cannot be completed by the first independent web service, the first agent broadcasts a request for help; and the second agent responds to the request for help; and assistance is obtained from the second agent and the second independent web service to complete the user instruction.

10. The method of coordinating web services claim 9, wherein the dynamic coordination of the independent web services is implemented by subjecting the independent web services to at least one module selected from a group consisting of a domain module, registration module and agent coordination logic module.

11. The method of claim 10, further comprising:
associating the agent coordination logic module with the first agent; and
associating the agent coordination logic module with the second agent.

12. The method of claim 11, further comprising:
determining whether the first independent web service can be supplemented with the second independent web service.

13. The method of claim 11, further comprising:
determining whether the first independent web service and the second independent web service can be used to provide an enhanced web service.

14. The method of claim 10, further comprising:
registering the first independent web service with the registration module.

15. The method of claim 14, further comprising:
receiving a notification related to the implementation of the second independent web service from the second agent.

16. The method of claim 15, further comprising:
registering the second independent web service with the registration module.

17. The method of claim 9, wherein the dynamic coordination occurs independent of a user instruction.

18. A computer readable medium for storing a computer program when executed by a computer instructs to execute a method for coordinating web services, comprising:
obtaining an ontological description of a first independent web service implemented by a first agent;
obtaining an ontological description of a second independent web service implemented by a second agent;
determining whether the implementation of the first independent web service can be coordinated with the implementation of the second independent web service; and
dynamically coordinating the implementation of the first independent web service with the implementation of the second independent web service according to the determined obtained ontological description of the first independent web service and the determined obtained ontological description of the second independent web service;
wherein when a user instruction cannot be completed by the first independent web service, the first agent broadcasts a request for help; and the second agent responds to the request for help; and the code segment for dynamically coordinating the implementation of the web services obtains assistance from the second agent and the second independent web service to complete the user instruction.

19. The computer readable medium of claim 18, further comprising:
associating an agent coordination logic module with the first agent and with the second agent.

20. The computer readable medium of claim 18, further comprising:

determining whether the first independent web service can be supplemented with the second independent web service.

21. The computer readable medium of claim 18, further comprising:

defining at least one descriptive language used to describe the first independent web service and the second independent web service.

22. The computer readable medium of claim 18, further comprising:

receiving the ontological description of the first independent web service from a shared ontology module.

23. The computer readable medium of claim 18, wherein the ontological description of the first independent web service and the ontological description of the second independent web service are determined according to a shared ontology.

24. The computer readable medium of claim 18, wherein the dynamic coordination of the independent web services is implemented by subjecting the independent web services to at least one module selected from a group consisting of a domain module, registration module and agent coordination logic module.

* * * * *

UNITED STATES PATENT AND TRADEMARK OFFICE
CERTIFICATE OF CORRECTION

PATENT NO. : 7,441,038 B2  Page 1 of 1
APPLICATION NO. : 10/352219
DATED : October 21, 2008
INVENTOR(S) : Javier B. Arellano et al.

It is certified that error appears in the above-identified patent and that said Letters Patent is hereby corrected as shown below:

At column 15, line 39 (claim 8, line 2) of the printed patent, "onto logical" should read -- ontological --.

At column 15, line 48 (claim 9, line 3) of the printed patent, "onto logical" should read -- ontological --.

At column 15, line 50 (claim 9, line 5) of the printed patent, "onto logical" should read -- ontological --.

At column 16, line 52 (claim 18, line 21) of the printed patent "the code segment" should be deleted.

Signed and Sealed this

Twelfth Day of May, 2009

JOHN DOLL
*Acting Director of the United States Patent and Trademark Office*